United States Patent
Cordery et al.

(10) Patent No.: US 6,839,693 B1
(45) Date of Patent: Jan. 4, 2005

(54) SYSTEM FOR DETECTING MAIL PIECES WITH DUPLICATE INDICIA

(75) Inventors: Robert A Cordery, Danbury, CT (US); Monroe A. Weiant, Jr., Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 851 days.

(21) Appl. No.: 09/667,844

(22) Filed: Sep. 21, 2000

(51) Int. Cl.[7] ............................................. G07B 17/00
(52) U.S. Cl. .................................................... 705/404
(58) Field of Search ......................... 705/62, 401, 404, 705/410

(56) References Cited

U.S. PATENT DOCUMENTS

| | | | |
|---|---|---|---|
| 5,390,251 A | 2/1995 | Pastor et al. | 380/21 |
| 5,666,421 A | 9/1997 | Pastor et al. | 380/51 |
| 5,917,925 A | 6/1999 | Moore | 382/101 |
| 6,029,137 A | 2/2000 | Cordery et al. | 705/1 |
| 6,039,257 A * | 3/2000 | Berson et al. | 235/468 |
| 6,058,190 A | 5/2000 | Cordery et al. | 380/51 |
| 6,064,995 A | 5/2000 | Sansone et al. | 705/410 |

FOREIGN PATENT DOCUMENTS

| | | | |
|---|---|---|---|
| EP | 0862145 A2 * | 9/1998 | |
| WO | WO 02/25597 A1 * | 3/2002 | |

OTHER PUBLICATIONS

News Release: Thumbscan Biometric Security System Released; Growing List of Users Install Systems; Jan. 16, 1989, p. 1.*

* cited by examiner

Primary Examiner—Edward R. Cosimano
(74) Attorney, Agent, or Firm—Brian A. Lemm; Angelo N. Chaclas

(57) ABSTRACT

A system and corresponding method for detecting duplicate indicia on mailpieces. The system includes: a plurality of postal machines, each operated by a particular branch postal facility among a plurality of branch postal facilities, each postal machine having a scanning system for scanning indicia, each responsive to selection criteria, and each for providing data from sampled indicia based on the selection criteria and also for providing results of local verification of indicia; the plurality of branch postal facilities, each operating at least one of the postal machines, each responsive to selection criteria received from a central postal site, and in turn for providing the selection criteria to at least one of the postal machines it operates, each further responsive to the sampled indicia and to the local verification results provided by the postal machines it operates, and each for further providing to the central postal site data from the sampled indicia as well as a summary of all of the local verification results received from the postal machines it operates; and the central postal site, responsive to the sampled indicia and to the summary of the local verification results provided by each branch postal facility, for determining a duplicate detection list based on the sampled indicia, and for generating selection criteria to replace existing selection criteria and providing the selection criteria to the branch postal facilities so as to control sampling by the branch postal facilities by restricting the sampling to a subset that is a fraction of all indicia.

12 Claims, 2 Drawing Sheets

SYSTEM FOR DETECTING MAIL PIECES WITH DUPLICATE INDICIA

TECHNICAL FIELD

The present invention pertains to the field of detecting fraud in providing postage for mail pieces, and more particularly to the detection of duplicate indicia.

BACKGROUND OF THE INVENTION

Many mailpieces are today mailed using postage affixed by a postage metering system. Such a postage metering system may be either a so-called open system or a closed system. Closed systems are described in PERFORMANCE CRITERIA FOR INFORMATION-BASED INDICIA AND SECURITY ARCHITECTURE FOR CLOSED IBI POSTAGE METERING SYSTEMS (PCIB-C), Jan. 12, 1999, by the United States Postal Service. Open systems are described in PERFORMANCE CRITERIA FOR INFORMATION-BASED INDICIA AND SECURITY ARCHITECTURE FOR OPEN IBI POSTAGE EVIDENCING SYSTEMS, Feb. 23, 2000, by the United States Postal Service. Either type of such metering systems, called here simply meters, affix an indicium that includes the postage required by the mailpiece, as well as other information. In particular, the indicium on a mailpiece also includes: the postal security device (PSD) serial number, called here a meter number, of the meter used to affix the postage; the date of mailing of the mailpiece; a digital signature; an algorithm identifier for identifying the algorithm used to create the digital signature; and in case of open systems, the destination delivery point, which for destinations in the United States is simply the destination zip code.

The digital signature and destination delivery point allow the indicium on a mailpiece to be verified to a certain extent. It is possible via the digital signature and destination address to test an indicium and so to determine whether the indicium is fraudulent on its face. If an indicium survives such a test, in what is here called local verification, only two possible cases are left: either the indicium is authentic and valid or it is a duplicate (copy) of an authentic, valid indicium.

According to the prior art, in detecting indicia that are fraudulent because they are duplicates of other, valid indicia, a postal authority samples a stream of indicia, where each indicium is sampled with a random independent sample probability S. If one pair of the indicia are duplicates, then the probability of sampling both of the pair of indicia is $S^2$. With this random independent sampling, if the sample rate is 1%, the detection probability is 0.01%, and if the sample rate is 10%, the detection probability is 1%. When the sample rate increases to 100%, of course, the detection probability also increases to 100%.

Having to sample for example 10% of all indicia to achieve a detection probability of only 1% requires what can be an extraordinary effort for so little gain.

What is needed is a system for detecting duplicates that provides greater detection probability for the same rate of sampling as is used in random independent sampling, even if the improved detection probability applies only to a subset of all indicia.

SUMMARY OF THE INVENTION

Accordingly, the present invention provides a system and corresponding method for detecting duplicate indicia, the system including a postal site, responsive to sampled indicia with the sampling controlled by selection criteria, for determining a duplicate detection list by comparing the sampled indicia, and for providing selection criteria to replace any existing selection criteria so as to control future sampling by restricting the sampling to a subset that is a fraction of all indicia, wherein the selection criteria is based on a characteristic of indicia, thereby controlling sampling so as to affect the likelihood of detecting duplicate indicia.

In a further aspect of the invention, the selection criteria specify all indicia with a certain value of a particular digit of a meter number, and in a still further aspect of the invention, the selection criteria also provide a sampling rate for the subset.

In another, further aspect of the invention, the selection criteria are periodically changed, and in some applications, the selection criteria are determined based on a hash of a date.

The corresponding method includes the steps of: generating selection criteria based on information conveyed by indicia; accumulating only indicia that meet the selection criteria; and examining the accumulated indicia for duplicates of the indicia. In a further aspect of the corresponding method, in the step of accumulating only indicia that meet the selection criteria, each such indicium is sampled based on a pre-determined sampling rate for random independent sampling.

BRIEF DESCRIPTION OF THE DRAWINGS

The above and other objects, features and advantages of the invention will become apparent from a consideration of the subsequent detailed description presented in connection with accompanying drawings, in which.

DETAILED DESCRIPTION

Figure 1:
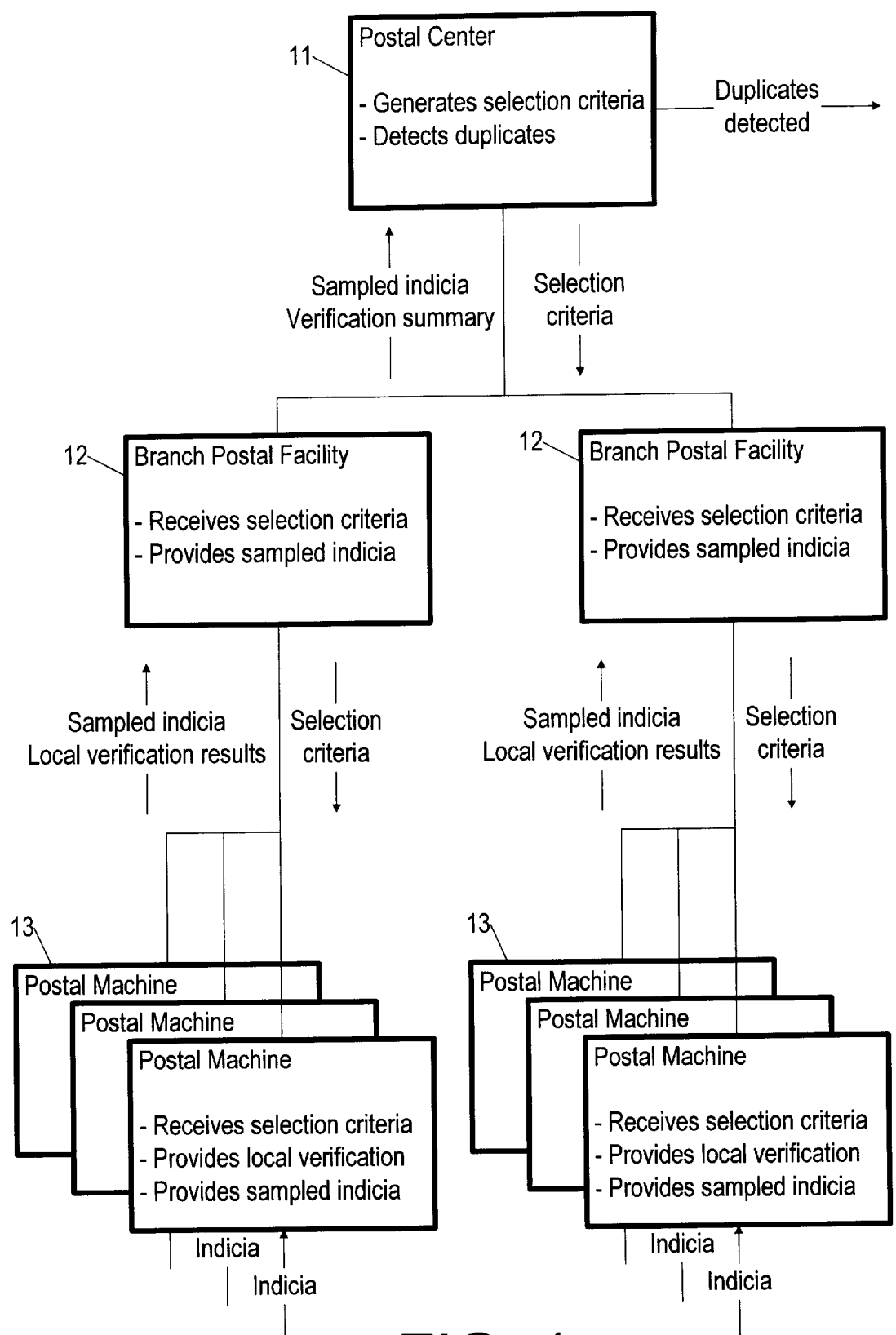
FIG. 1 is a block diagram of a system for which the method of the present invention is intended.

A system for detecting duplicate indicia according to the present invention differs from the prior art in that it does not rely on random, independent sampling. If instead of random independent sampling, indicia are sampled based on a subset of the data an indicium conveys, the detection probability can be improved. For example, the indicium conveys the meter number, and if all indicium corresponding to a meter number with a particular value for the last digit are sampled, then any duplicates meeting the selection criteria will be included in this subset. If all of the subset is then sampled, the probability of detecting at least the duplicates that meet the selection criteria is substantially increased.

It is important to understand that meters typically have 7-digit numbers, but instead of there being one less than ten million meter numbers in use today, since meter numbers can not be reused, there is in use today only a fairly small fraction of the total number of meter numbers. Therefore, fixing the last digit of a meter number amounts to a selection criteria that calls for sampling indicia from approximately 10% of all meters. Specifying as a selection criteria that the last two digits of the meter number be a fixed value corresponds to specifying that indicia produced by approximately 1% of all meters in operation today be sampled.

Thus, if the selection criteria is that the last two digits of the meter number conveyed by the indicium on a mailpiece each have a particular value (preferably chosen at random), then the subset of the indicia that will be sampled is approximately 1% of all the indicia, and if all of that subset is sampled, then the detection probability is also 1%. This therefore corresponds to a 100-fold increase in detection probability for duplicates meeting the selection criteria.

It is not necessary to sample all of a subset to achieve an improvement in the detection probability. Instead of sampling 100% of a subset that is a fraction F of all indicia, it is possible to sample the subset at a sampling rate S so that the fraction sampled of all indicia is FS. Thus, it is possible to sample at an overall rate of only 1% and yet achieve a detection probability of 0.1%, which is 10 times greater than what can be achieved by random independent sampling at a rate of 1%.

Table 1 below provides a detection probability corresponding to various sample rates S in case of random independent sampling. Table 2 provides a detection probability in case of sampling of all of the indicia in a fraction F of the indicia that meet selection criteria. Thus, for example, the selection criteria yielding a subset size F equal to 1% are that the last two digits of the meter number (or any two digits of the meter number) conveyed by the indicia have a specified value.

TABLE 1

Detection probability for various random independent sampling at various sampling rates.

| Sample rate S | Detection probability |
| --- | --- |
| 0.1% | 0.0001% |
| 1% | 0.01% |
| 10% | 1% |
| 100% | 100% |

TABLE 2

Detection probability for various subset sizes with 100% sampling of all indicia in the selected subsets.

| Subset size F | Detection probability |
| --- | --- |
| 0.1% | 0.1% |
| 1% | 1% |
| 10% | 10% |
| 100% | 100% |

Finally, Table 3 gives detection probabilities for various subset sizes for different subset sampling rates. Thus, for example, a detection probability of 0.1% can be achieved by specifying as selection criteria that the third digit of the meter number have a fixed value and then sampling 10% of all of the indicia meeting the selection criteria. The end result is that only 1% of all of the indicia are sampled to achieve the 0.1% detection probability, whereas the same sampling rate in the case of random independent sampling would achieve a detection probability of only 0.01%, as indicated in Table 1.

TABLE 3

Detection probability for various subset sizes with various sampling rates for sampling the selected subsets.

| Subset size (F) | Sample rate of subset (S) | Net Sample rate (S) | Detection probability (FS$^2$) |
| --- | --- | --- | --- |
| 1% | 10% | 0.1% | 0.01% |
| 10% | 10% | 1% | 0.1% |
| 20% | 50% | 10% | 5% |
| 100% | 100% | 100% | 100% |

Referring now to FIG. 1, a postal system is shown operating according to the present invention using selection criteria to increase detection probability for duplicates meeting the selection criteria. The postal system includes a postal center 11 that receives sampled indicia from several different branch postal facilities 12. Each branch postal facility 12 operates at least one and typically several postal machines 13. According to the invention, the postal center 11 generates selection criteria, as will be described below, and provides the selection criteria to each of its branch postal facilities 12. In turn, each branch postal facility 12 provides a selection criteria to each of its postal machines 13. The selection criteria includes for example requiring that one or more identified digits of a meter number each have a particular value. The selection criteria can also include a sampling rate of less than 100%. Then as a result of receiving the selection criteria, each postal machine will sample only those indicia that meet the selection criteria, which in essence specifies a subset of size F and, optionally a sampling rate S of the subset. The postal machine will then perform random independent sampling of the subset at the indicated sampling rate S or will sample all of the subset if no sampling rate is specified.

The sampled indicia from each of the postal machines 13 are collected by the respective branch postal facility 12 and each of the branch postal facilities 12 then provides the sampled indicia from each of its postal machines 13 to the postal center 11. It is the postal center that examines all of the sampled indicia to detect duplicates. It is the postal center that also determines new selection criteria to replace existing selection criteria.

In the preferred embodiment, the postal machines also provide to the branch their respective branch postal facility local verification results. The local verification results are the results of checking that the destination address (when available) agrees with the indicium on the mail piece, and that the digital signature conveyed in the indicium of each mail piece is authentic. The postal center from time to time may use the local verification result summaries as a basis for new selection criteria. However, usually, it is preferable to generate the selection criteria by a complex mechanism, making it difficult for anyone to anticipate the selection criteria and so avoid being detected.

For example, a selection criteria could be generated based on a secret key encryption of some indicia data. More specifically, the selection criteria with respect to the subset size F could for example be generated based on a hash of the day of the year on which the selection criteria are being generated. Thus for example, if selection criteria are being generated on January 2, the selection criteria might be generated by hashing the date January 2 and then taking two digits from the hash result to indicate the digits of the meter number and another two digits of the hash result to indicate the values for those digits.

It is advantageous to periodically change the selection criteria for several reasons, such as to be able to detect fraud in case of indicia indicating meter numbers that do not meet the existing selection criteria. As a result, however, it is possible for one to avoid detection by mailing a duplicate indicium after a time longer than the period for changing the selection criteria. To avoid this problem, in the preferred embodiment, the detection system uses the date of submission on an indicium (i.e. the date on which the indicium was imprinted) rather than the current date, to determine which subset to select. Thus, each mailing machine would remember previous selection criteria and the time period for which the selection criteria was to be used, at least for some reasonable length of time extending into the past, such as for three months.

To provide faster switching between meter number ranges, instead of using a period of a month between changes in selection criteria, a shorter period can be used, such as a day. The time period over which the system remembers past selection criteria, however, should not be changed when switching to a shorter period between changes in selection criteria.

In some embodiments, selection criteria are based on indicia data other than a machine number. For example, postage amounts could be used as a basis for sampling, and in particular high-value postage amounts, such as over $1.00, to increase the chance of detecting high-value duplicates.

Figure 2:
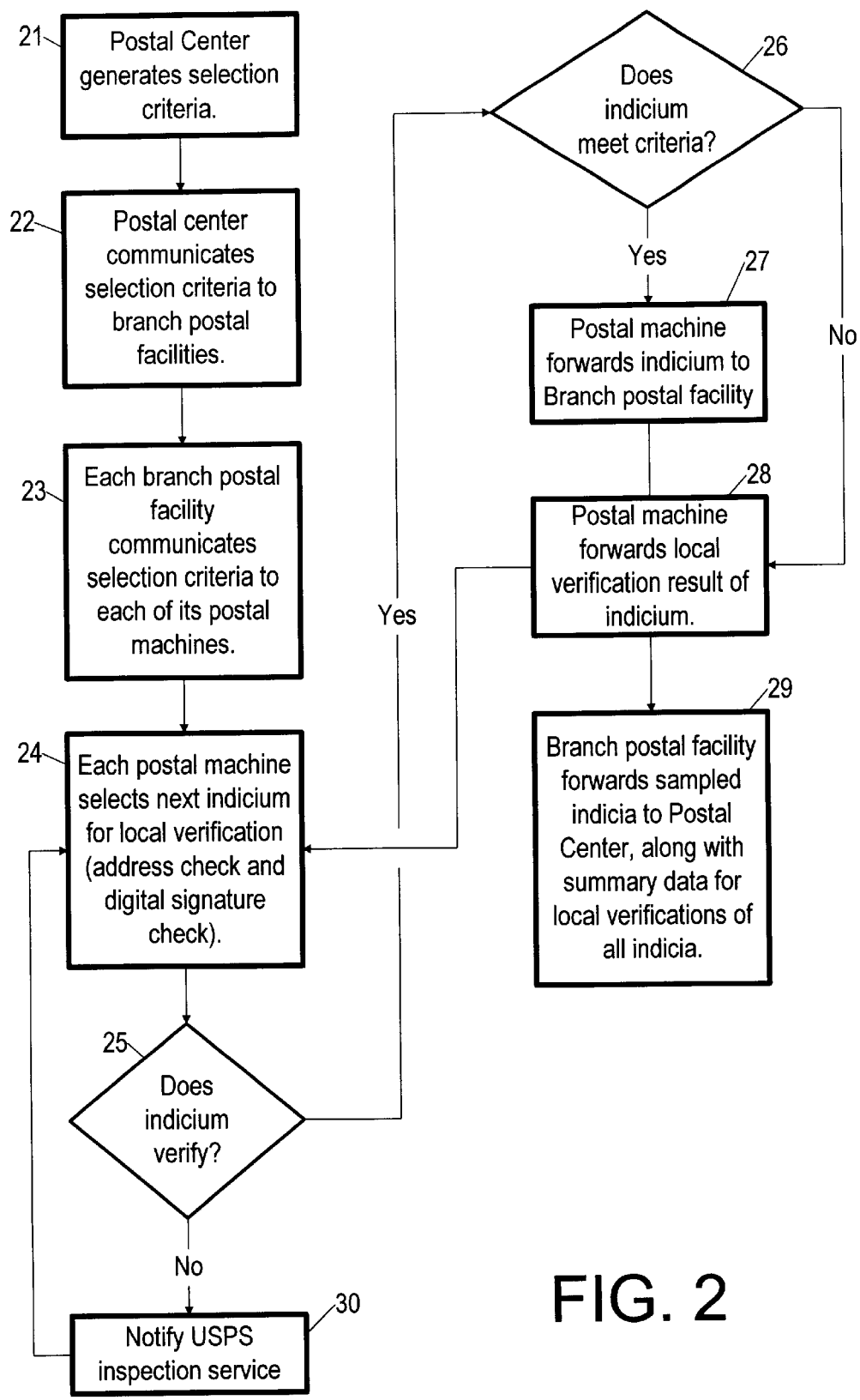
FIG. 2 is a flowchart showing the method of the present invention.

Referring now to FIG. 2, the overall method of the present invention is shown beginning with a step 21 in which the postal center generates the selection criteria, preferably using a complex mechanism and so making it difficult for anyone to anticipate the selection criteria. Then in a step 22 the postal center communicates the selection criteria to branch postal facilities, which in turn in step 23 communicate the selection criteria to each of the postal machines they operate.

In a step 24, each postal machine selects a next indicium without regard to the selection criteria. It performs local verification of the indicium, i.e. it checks that the destination address printed on the mail piece agrees with the zip code included in the indicium if the indicium includes the destination address zip code, and checks that the digital signature is authentic. Next, in a decision block 25, if the indicium is verified, then in a decision block 26 the postal machine determines whether the indicium meets the selection criteria. If it does, then in a step 27, the postal machine forwards the data from the indicium to its branch postal facility. (Only the data is forwarded for duplicate detection.) In a step 28, regardless of whether the indicium met the selection criteria, the postal machine forwards the local verification result for the indicium to the branch postal facility. In a step 29, the branch postal facility forwards the data from the sampled indicia to the postal center along with a summary of the local verifications of all indicia. Note also that if the indicium does not pass the local verification test, then in a step 30 the U.S. Postal Inspection Service is notified.

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A system for detecting duplicate indicia comprising:
   a postal site to sample indicia based on selection criteria, the selection criteria being periodically changed and determined based on a date included in the indicia, the postal site determining a duplicate detection list by comparing the sampled indicia and providing selection criteria to replace an existing selection criteria to thereby control future sampling by restricting the sampling to a subset that is a fraction of all indicia,
   wherein the selection criteria is based on a characteristic of the indicia.

2. The system of claim 1, wherein the indicium includes a date of submission indicating a date on which the indicium was imprinted on a mail piece, and wherein the date of submission is used to determine which subset to select.

3. The system of claim 1, wherein the selection criteria specify all indicia with a certain value of a particular digit of a meter number.

4. The system of claim 3, wherein the selection criteria further provide a sampling rate for the subset.

5. A system for detecting duplicate indicia, comprising:
   a plurality of postal machines, each postal machine having a scanning system for scanning indicia, each postal machine responsive to selection criteria, the selection criteria being periodically changed and determined based on a date included in the indicia, each postal machine replacing any existing selection criteria upon receiving new selection criteria, each postal machine for providing data from sampled indicia based on the selection criteria and also for providing results of local verification of indicia;
   a plurality of branch postal facilities, each branch postal facility operating at least one of the postal machines and receiving the data from the sampled indicia and the results of the local verification of the indicia provided by the postal machines it operates, each branch postal facility providing the selection criteria to at least one of the postal machines it operates, each branch postal facility for further providing data from the sampled indicia provided by the postal machines it operates and a summary of all of the local verification results provided by the postal machines it operates; and
   a central postal site to receive the data from the sampled indicia and the summary of the local verification results provided by each branch postal facility, the central postal site determining a duplicate detection list based on the sampled indicia, generating selection criteria to replace existing selection criteria and providing the selection criteria to the branch postal facilities to control sampling by the branch postal facilities by restricting the sampling to a subset that is a fraction of all indicia.

6. The system of claim 5, wherein the indicium includes a date of submission indicating a date on which the indicium was imprinted on a mailpiece, and wherein the date of submission is used to determine which subset to select.

7. The system of claim 6, wherein the selection criteria specifies all indicia with a certain value of a particular digit of a meter number.

8. The system of claim 7, wherein the selection criteria further provide a sampling rate for the subset.

9. A method for detecting duplicate indicia on mail pieces comprising:

scanning an indicium on a mail piece;

determining a selection criteria based at least in part on a date included in the scanned indicium, the selection criteria including a portion of information included in the indicia, the selection criteria being different based on the date included in the scanned indicium;

determining if the scanned indicium meets the determined selection criteria;

accumulating all indicia that meet the determined selection criteria; and comparing the accumulated indicia to detect duplicate indicia.

10. The method of claim 9, wherein comparing the accumulated indicia further comprises:

selecting a subset of the accumulated indicia and comparing the selected subset of accumulated indicia to detect duplicate indicia.

11. The method of claim 10, wherein selecting a subset further comprises:

selecting a subset based on a predetermined sampling rate.

12. The method of claim 9, wherein the portion of information included in the indicia includes a portion of a meter identification number.

\* \* \* \* \*